Aug. 10, 1926.

T. B. SLATE 1,595,426

REFRIGERATING APPARATUS

Original Filed Jan. 10, 1924

INVENTOR
Thomas B. Slate
BY
George C. Deen
his ATTORNEY

Patented Aug. 10, 1926.

1,595,426

UNITED STATES PATENT OFFICE.

THOMAS B. SLATE, OF NEW YORK, N. Y., ASSIGNOR, BY MESNE ASSIGNMENTS, TO INTERNATIONAL PATENTS HOLDING CORPORATION, OF NEW YORK, N. Y., A CORPORATION OF DELAWARE.

REFRIGERATING APPARATUS.

Original application filed January 10, 1924, Serial No. 685,482. Divided and this application filed September 27, 1924. Serial No. 740,164.

My present invention relates more particularly to refrigerating perishable products by means of frozen carbon dioxide enclosed in a suitably insulated container which has the products to be refrigerated above, below and around it so that its insulated walls operate to absorb heat from the perishable products and from the surrounding atmosphere within the refrigerator, and to apply said heat to the frozen carbon dioxide whereby it is absorbed as latent heat, producing a corresponding amount of intensely cold carbon dioxide gas without any intermediate liquid state, said gas being liberated in operative relation to refrigerate such products, dry them, and protect them from air. Various forms of apparatus working on this principle are set forth in my Patent No. 1,511,306, granted October 14, 1924, on my application, Serial No. 685,482, filed January 10, 1924 of which this application is a division.

The subject matter of this present application is a heavily insulated package or shipping case filled with perishable products, preferably such as is desired to keep very cold and to preserve from the atmosphere, and particularly such as are not damaged by temperatures far below freezing, as for instance, yeast or ice cream or hard frozen products which are packed in said refrigerator case, in close heated exchange relation with the insulated container of frozen carbon dioxide and the fresh intensely cold gas escaping from said container.

The above and other features of my invention may be more fully understood from the following description in connection with the accompanying drawings, in which—

Figure 1:
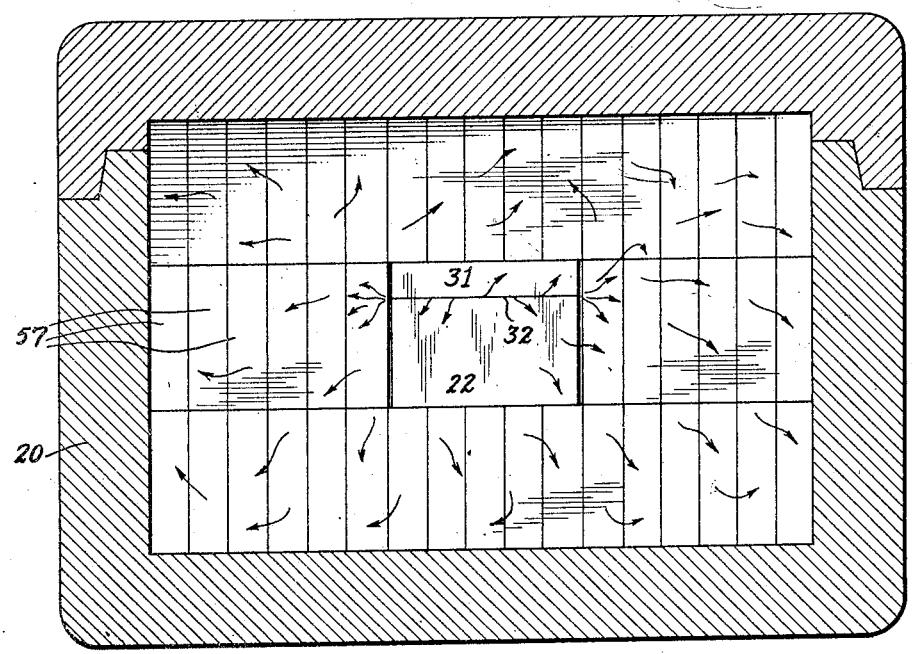
Figure 2:
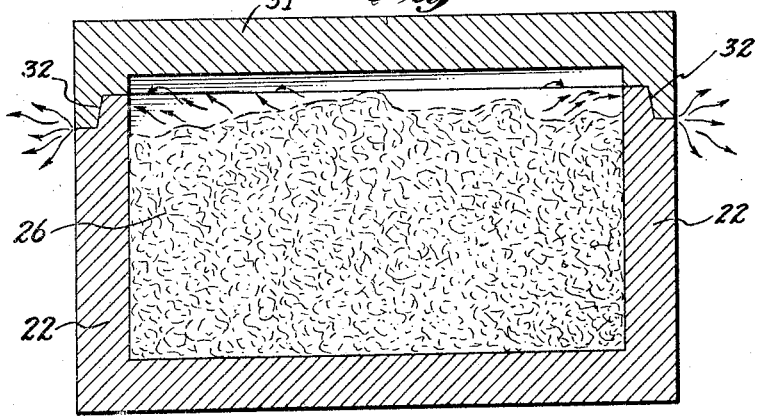

Fig. 1 is a vertical section through a shipping case containing food products and a carbon dioxide snow chamber or refrigerant container in the center thereof; and Fig. 2 is a vertical section through the chamber 22.

As shown in these drawings, I provide a simple means using the insulated container 22 for the frozen carbon dioxide within a small shipping box or refrigerator 20 for the shipment of small quantities of perishable products 57, which are thus easily and efficiently refrigerated. By making snow chamber 22 of the proper size to displace a given number of packages of the perishable products to be shipped and by filling chamber 22 with frozen carbon dioxide and placing it in the midst of the said products shipped, it will slowly and gradually refrigerate those products by the escaping gas which forces its way under the lid of chamber 22 and continuously keeps the air and moisture displaced.

The container 22 for the frozen carbon dioxide, as also the shipping container 20, may be of balsa wood, but may have the vacuum-wall type of insulation if found desirable. As shown, the covers of both the shipping box and the refrigerant container are close-fitting, and the walls are of exceptional thickness.

As stated in my prior application, carbon dioxide snow as deposited, is light and porous, but I prefer to use it in ice form, made either by highly compressing the snow or by freezing the carbon dioxide directly. As the carbon dioxide ice is nearly twice as dense as water ice and affords nearly twice as much refrigerant value per pound, it is particularly desirable for shipping purposes where express or freight charges are important.

In this form of my invention where the container or the carbon dioxide is midway of the products to be preserved, it is evident that the insulation cannot prevent freezing of some or all of said product because, regardless of insulation, the fresh gas escaping from the inner container impinges directly on adjacent products before it has any opportunity to diffuse or to become warmed the 140° or more F. which would be required to reach the relatively high freezing point of water.

From the above, it will be evident that my present invention differs from all the other forms described in my said prior application and patent in the particular that the carbon dioxide snow or ice refrigerant is in or among packages or masses of the perishable products whereby certain portions of the perishable products are in close proximity to this intense refrigerant, as for instance, portions of packages in contact with the refrigerant container, while other portions are relatively remote, as for instance, those near or in contact with the outer walls of the shipping or storage case. Obviously, the products close to, and particularly those in contact with, the carbon dioxide container, are certain to be reduced to temperatures far below parts of the mass that are more remote. This is very different from the situation in all of the other forms shown in my said patent, wherein all of the products are refrigerated by convection currents more than by actual conduction of the heat through portions of the product that are refrigerated.

So far as concerns the specific method, my present invention is therefore clearly distinguishable from arrangements of the type shown in Fig. 15 in said patent, wherein there is a refrigerator particularly adapted for products requiring widely different temperatures, but all refrigerated from a single source by convection currents which take effect first on the products that are not damaged by over-freezing and subsequently on other products that are not to be frozen. As contrasted with this, the specific method hereof contemplates a box or case in which all of the products to be refrigerated are of the same kind; all of them, even the remotest, are to be kept near or below freezing; and none of them are damaged by severe over-freezing that will occur in those portions most directly exposed to the refrigerant.

I claim:—

1. A package for transporting and preserving masses or parcels of a perishable product of the type not damaged by severe over-freezing which consists of an outer insulated container, in which are packed masses or parcels of such perishable product in close proximity to an insulated inner container enclosing a quantity of frozen carbon dioxide which on absorption of heat through the insulation of said container, passes directly from the solid to the gaseous state; said inner container permitting the carbon dioxide gas, as formed, to escape in freezing proximity to said masses or parcels of said perishable product.

2. A heavily insulated package enclosing in close proximity to a parcel or mass of material not damaged by over-freezing during shipment, a quantity of frozen carbon dioxide insulated from but in freezing relation to said parcel or mass so that portions of the material are more directly and intensely refrigerated than other portions for the purpose and with the result of sufficiently refrigerating more remote portions, whereby on absorption of heat through said insulation, said carbon dioxide passes directly from the solid to the gaseous state; and said gas, as formed, escapes in freezing and insulating relation to said materials.

3. A transportation package consisting of a vented protective casing of insulating material enclosing a quantity of frozen carbon dioxide sufficient to afford refrigeration for the desired period and a quantity of freezable product in freezing proximity to said carbon dioxide and the gas evaporated therefrom and arranged so that said frozen carbon dioxide is less accessible for exterior heat than said freezable products.

4. A protective casing of insulating material having therein a quantity of frozen carbon dioxide sufficient to afford refrigeration for the desired period and a quantity of freezable product separated from but in freezing proximity to said frozen carbon dioxide and insulated by the gas evaporated therefrom.

5. A protective casing of insulating material having therein a quantity of frozen carbon dioxide in an insulating container and a quantity of freezable product in freezing proximity to said frozen carbon dioxide and insulated by the gas evaporated therefrom.

6. A transportation package consisting of a protective casing of insulating material having packed therein a quantity of frozen carbon dioxide in an insulating container and a quantity of freezable product in freezing proximity to said frozen carbon dioxide and the gas evaporated therefrom, arranged so that said frozen carbon dioxide is less accessible for exterior heat than said freezable products.

7. A transportation package consisting of a vented protective casing of insulating material having packed therein a quantity of freezable product in freezing proximity to a quantity of frozen carbon dioxide sufficient to afford the desired amount of refrigeration.

8. The combination of a shipping case to be refrigerated, a container of frozen carbon dioxide packed in the case with perishable products, said container being formed of or including substantial insulating means in contact with said perishable products, the capacity of the container being proportioned to the size and contents of the package to be refrigerated so as to maintain the products in frozen condition for the desired length of time by the refrigerating, preserving and moisture absorbing action of escaping carbon dioxide gas produced by the evaporation of the frozen carbon dioxide within the aforesaid container, under normal conditions.

9. An insulated shipping case, similar parcels of perishable products packed solidly in said case, surrounding and supporting an insulated container of frozen carbon dioxide, having dimensions corresponding to and fitting among the said parcels.

10. An outer thick walled balsa wood case or box containing like parcels of perishable products; and an inner insulated container for frozen carbon dioxide of much smaller size, located within said outer case and in direct contact with, and absorbing heat from, and discharging resultant cold carbon dioxide among parcels of said perishable products; the capacity of said container and its insulation being proportioned to the amount of refrigeration required by said products.

Signed at New York city in the county of New York, and State of New York, this 23rd day of September, A. D. 1924.

THOMAS B. SLATE.